(12) United States Patent
Baig et al.

(10) Patent No.: US 8,831,881 B1
(45) Date of Patent: Sep. 9, 2014

(54) INTERACTIVE USER INTERFACE FOR DISPLAYING AVAILABLE TRIPS

(71) Applicant: Google Inc., Mountain View, CA (US)

(72) Inventors: Haroon Baig, Zurich (CH); Florian Goerisch, Zurich (CH); Joshua Wilder, Zurich (CH); Albert Graells, Zurich (CH); Thijs van As, Zurich (CH); Stephan Seyboth, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/894,477

(22) Filed: May 15, 2013

(51) Int. Cl.
*G01C 21/00* (2006.01)
*G01C 21/34* (2006.01)
*G06Q 10/04* (2012.01)
*G06Q 10/02* (2012.01)
*G06Q 50/30* (2012.01)

(52) U.S. Cl.
CPC .............. *G01C 21/34* (2013.01); *G06Q 10/047* (2013.01); *G06Q 10/025* (2013.01); *G06Q 50/30* (2013.01)
USPC .......................... 701/533; 701/117; 340/572.1

(58) Field of Classification Search
CPC ... G06Q 10/02; G06Q 10/025; G06Q 10/047; G06Q 50/30; G06K 7/10079; G01C 21/32; G08G 1/20; G08G 1/123; G06F 17/30398; G06F 19/00; H04W 64/00; H04W 4/02; Y04S 10/126; Y04S 30/14
USPC ................................ 701/117, 533; 340/572.1
See application file for complete search history.

(56) References Cited

U.S. PATENT DOCUMENTS

| | | | |
|---|---|---|---|
| 4,926,343 A | 5/1990 | Tsuruta et al. | |
| 7,409,643 B2 * | 8/2008 | Daughtrey | 715/763 |
| 8,306,749 B1 | 11/2012 | Petersen et al. | |
| 8,306,835 B2 | 11/2012 | De Marcken et al. | |
| 8,306,841 B2 | 11/2012 | Clarke | |
| 8,341,003 B1 | 12/2012 | Bilibin et al. | |
| 8,355,862 B2 | 1/2013 | Matas et al. | |
| 8,417,409 B2 * | 4/2013 | Bast et al. | 701/25 |
| 8,433,341 B2 | 4/2013 | Dredge | |
| 8,442,874 B2 * | 5/2013 | Moorhead | 705/27.1 |
| 2009/0006160 A1 * | 1/2009 | Boegner | 705/8 |
| 2011/0208417 A1 | 8/2011 | Fink et al. | |
| 2012/0185793 A1 * | 7/2012 | Binsztok | 715/772 |
| 2012/0203578 A1 * | 8/2012 | Baggett et al. | 705/5 |
| 2012/0239441 A1 * | 9/2012 | Eagle, III | 705/5 |

(Continued)

OTHER PUBLICATIONS

Here Transit—Windows Phone Apps—www.windowsphone.com/en-us/store/app/here-transit—2 pages.

(Continued)

*Primary Examiner* — McDieunel Marc
(74) *Attorney, Agent, or Firm* — Dority & Manning, P.A.

(57) ABSTRACT

An interactive user interface for displaying available trips is provided. The user interface includes a calendar overview tool. An exemplary computing system has a processor and a memory. The computing system is configured to perform operations including obtaining data describing a plurality of trips between an origin and a destination. Each trip has a departure time and an arrival time. The operations also include respectively representing the plurality of trips with a plurality of trip identifiers at different positions on a first axis of a graph. The graph has units of time on a second axis. Each trip identifier extends from the arrival time to the departure time of the trip such trip identifier represents. An interval of time depicted by the graph can be adjusted by a user.

13 Claims, 8 Drawing Sheets

(56) References Cited

U.S. PATENT DOCUMENTS

| | | |
|---|---|---|
| 2012/0246148 A1 | 9/2012 | Dror |
| 2012/0290204 A1 | 11/2012 | Gueziec |
| 2013/0033385 A1 | 2/2013 | Gueziec |
| 2013/0063488 A1 | 3/2013 | Gaebler et al. |
| 2013/0124238 A1* | 5/2013 | Burrows et al. .................... 705/6 |
| 2013/0197950 A1* | 8/2013 | Boyd et al. ......................... 705/5 |
| 2013/0297359 A1* | 11/2013 | Eagle, III ........................... 705/5 |
| 2014/0019176 A1* | 1/2014 | Mandelbaum ...................... 705/6 |

OTHER PUBLICATIONS

MBTA—Online Trip Planning Tools—www.mbta.com/rider_tools/apps/Default.asp—6 pages.

Nokia—Transit Makes the Commute Over to Asha Touchscreen Phones, Adds Public Transport Info—www.engadget.com/2013/03/26/nokia-transit-app-asha-phones-beta—3 pages.

* cited by examiner

INTERACTIVE USER INTERFACE FOR DISPLAYING AVAILABLE TRIPS

FIELD

The present disclosure relates generally to providing navigational instruction. More particularly, the present disclosure relates to an interactive user interface for providing a plurality of available trips between an origin and a destination.

BACKGROUND

Systems and devices for providing navigational instruction have become increasingly commonplace in the modern world. In particular, geographic information systems or other mapping systems containing geographic information can provide users with the ability to receive navigational instruction with respect to travel between nearly any two locations.

For example, a user can implement a browser or specialized application on a laptop, smartphone, tablet, or other computing device to access a mapping system over a network to request and receive navigational instructions. In particular, navigational instructions can provide information concerning one or more trips available between an origin and a destination.

However, certain current user interfaces for providing information concerning available trips can fail to provide an intuitive sense of important information about such trips. For example, current user interfaces can fail to provide an intuitive sense of when, where, and how long an available trip will occur. Further, such user interfaces can fail to communicate various aspects of portions of each trip, such as an amount of walking that is required, a number of transfers required, and the type and duration of different vehicles used.

Therefore, it can be difficult for the user to compare a plurality of available trips between an origin and a destination. In particular, without having an intuitive sense of when, where, and how long each available trip will occur, the user may fail to select the trip that optimizes that particular user's needs or expectations.

SUMMARY

Aspects and advantages of the invention will be set forth in part in the following description, or may be obvious from the description, or may be learned through practice of the invention.

One aspect of the present disclosure is directed to a computing system. The computing system has a processor and a memory. The computing system is configured to perform operations including obtaining data describing a plurality of trips between an origin and a destination. Each trip has a departure time and an arrival time. The operations also include respectively representing the plurality of trips with a plurality of trip identifiers at different positions on a first axis of a graph. The graph has units of time on a second axis. Each trip identifier extends from the arrival time to the departure time of the trip such trip identifier represents. An interval of time depicted by the graph can be adjusted by a user.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
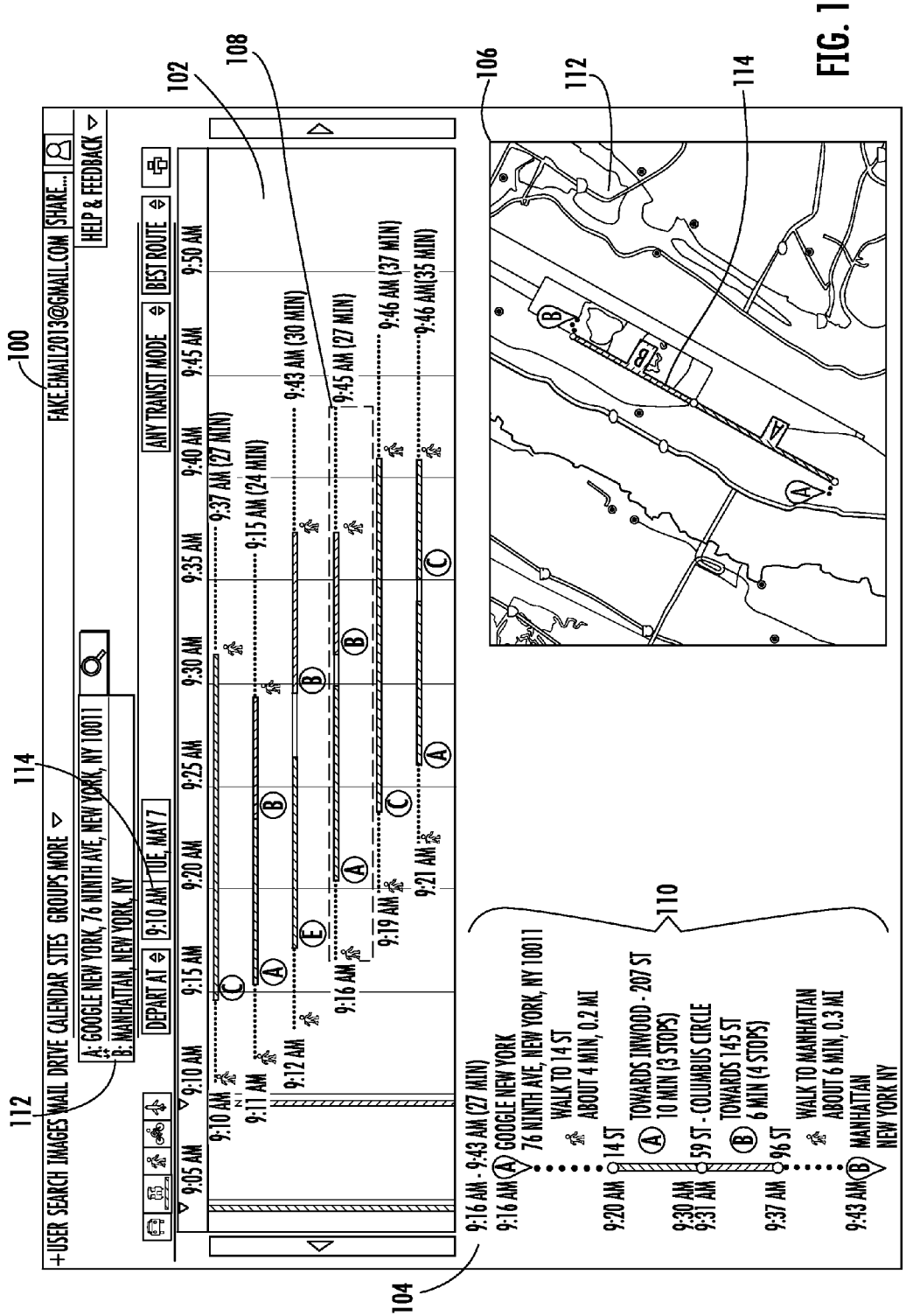
FIG. 1 depicts an exemplary user interface according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for providing an interactive user interface that displays a plurality of available trips between an origin and a destination. In particular, the user interface can include a calendar overview, a trip summary portion, and a map portion. Responsive to a user request, a plurality of trip identifiers can be presented in the calendar overview and can respectively represent available trips between the origin and the destination. The trip identifiers can provide an intuitive illustration of various aspects of the plurality of trips. For example, each trip identifier can depicted such that the user is provided with an intuitive sense regarding the overall duration of the trip, an amount of walking required by the trip, a number of transfers or legs, time spent in each leg of the trip, waiting time between legs, and/or other information such as vehicle types or providers. In such fashion, a user can easily compare the various aspects of the available trips. Furthermore, the calendar overview can be interactive or otherwise controllable by a user. For example, the user can select one of the plurality of trip identifiers to receive additional information in the trip summary and map portions of the user interface. As another example, an interval of time depicted by the calendar overview can be adjusted by the user. In particular, additional trip identifiers can be provided that represent a second plurality of trips available during the adjusted time interval shown by the calendar overview. In such fashion, the best available trips over an extended period of time can be illustrated and explored by a user operating the interactive user interface.

The calendar overview can include a graph that has units of time on a first axis. A plurality of trip identifiers can be respectively provided at a plurality of positions of a second axis of the graph. In particular, each trip identifier can extend from a departure time to an arrival time of the trip such trip identifier represents.

Further, each of the plurality of trips can include one or more legs. For example, a transit trip can include a plurality of legs that respectively correspond to discrete instances of transportation using one of a plurality of transit lines or modes of transportation. As another example, a leg of a trip can correspond to required walking from one location to another. Therefore, each trip identifier can include one or more portions that respectively correspond to the one or more legs of the trip such trip identifier represents.

Each portion of each trip identifier can be proportional to the duration of the leg to which such portion corresponds. Further, each portion of each trip identifier can provide an indication of the mode of transportation used by the leg to which such portion corresponds. Other information can be provided by each portion of the trip identifier as well, including, for example, vehicle type, vehicle provider, or other suitable information.

According to another aspect of the present disclosure, one or more of the trip identifiers provided in the calendar overview can be selected by a user. For example, a user can click on or press one of the trip identifiers to select it.

When a trip identifier is selected by a user, the trip represented by the selected trip identifier can be depicted in the map portion of the user interface. Further, a trip summary that provides additional details about each leg included in such trip can be provided in the trip summary portion of the user interface.

According to yet another aspect of the present disclosure, an interval of time depicted by the calendar overview can be adjusted by a user. For example, the user can scroll the calendar overview graph with respect to the axis having units of time. Alternatively, the user can specify a particular desired arrival or departure time and graph can be adjusted based upon such desired time.

When the graph is adjusted with respect to time, it can be populated with additional trip identifiers representing additional trips. In particular, such additional trips can respectively have departure and arrival times within the interval of time depicted by the graph after being adjusted based on the user input.

In such fashion, transit trips available over an extended period of time can be presented to the user in an interactive, calendar-style user interface. In particular, the trip identifiers used to represent the available trips can provide an intuitive sense of trip duration, number and duration of legs, arrival and departure times, and/or modes of transportation used. Thus, the user can easily explore all available trips and select the trip that best optimizes her particular needs or expectations.

With reference now to the FIGS., exemplary embodiments of the present disclosure will now be discussed in detail. FIG. 1 depicts an exemplary user interface 100 according to an exemplary embodiment of the present disclosure. User interface 100 can be implemented by a computing system or device in order to present available trips between an origin and a destination to a user.

User interface 100 can include a calendar overview 102, a trip summary portion 104, and a map portion 106. Calendar overview 102 can include a plurality of trip identifiers provided on a graph having units of time on an axis. For example, calendar overview 102 includes trip identifier 108.

Trip identifier 108 represents a particular trip available from the origin to the destination. In particular, such trip departs at 9:16 am from the origin and arrives at the destination at 9:43 am. Calendar overviews and trip identifiers will be discussed further with respect to FIG. 2.

In addition, while the trips depicted in user interface 100 are limited to transit trips that include instances of transportation using one or more transit lines, the present disclosure is not limited to such trips. In particular, as will be discussed further, any suitable trip between an origin and a destination can be provided to the user using user interface 100, including driving trips, walking trips, bicycling trips, trips that includes flights, or any suitable modes of transportation or combinations thereof.

Trip summary portion 104 can include a trip summary 110 that provides additional information concerning one of the available trips. Map portion 106 can depict one or more of the available trips on a map 112. For example, a trip 114 is depicted on map 112.

Map 112 can be generated from a variety of data types, including imagery, tables, vector data (e.g. vector representations of roads, parcels, buildings, etc.) and other data.

A scale or zoom level of map 112 can automatically be adjusted based upon one or more trip geometries respectively associated with one or more trips depicted on map 112. For example, the scale of map 112 or portion of map 112 provided in map portion 106 can automatically be adjusted to display the entirety of the path followed by any depicted trip, including the location of the origin and location of the destination.

User interface 100 can further include an origin/destination control 112 and a desired arrival/departure time control 114. Controls 112 and 114 can be text entry fields, dialog boxes, toggles providing a plurality of predefined, selectable options, or any other suitable item that provides user control functionality.

For example, origin/destination control 112 can be two text entry fields in which a user can input a desired origin and destination. As shown, the user has requested available trips between origin "Google New York, 76 Ninth Ave, New York, N.Y. 10011" and destination "Manhattan, New York, N.Y." Any suitable origin and destination can be entered by a user of the system.

As an example, desired arrival/departure control 114 can include an arrival/departure toggle, a text entry field, and a calendar-based date selection module. As shown, the user has indicated that she desires to depart the origin at 9:10 am on Tuesday, May 7.

Using the information provided in origin/destination control 112 and desired arrival/departure time control 114, a mapping system can return a plurality of available trips that satisfy the entered information. One or more of the returned plurality of trips can be represented by a trip identifier provided in calendar overview 102.

Figure 2:
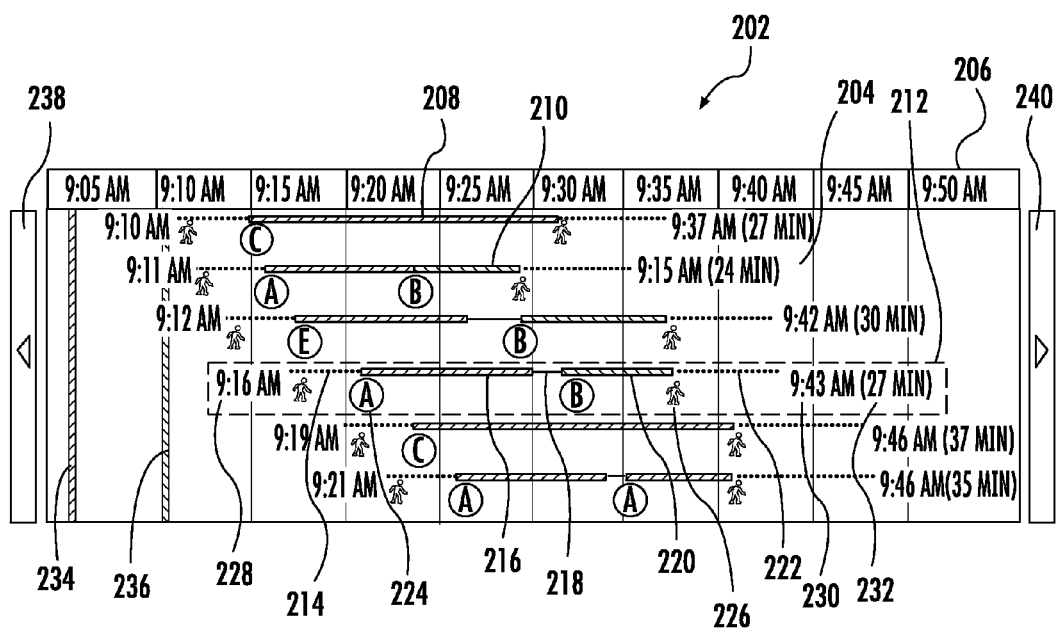
FIG. 2 depicts an exemplary calendar overview according to an exemplary embodiment of the present disclosure.

FIG. 2 depicts an exemplary calendar overview 202 according to an exemplary embodiment of the present disclosure. Calendar overview can include a graph generally 204 that has units of time on an axis 206. Axis 206 can be automatically scaled by a system implementing calendar overview 202 based on the duration of the trips that are to be represented in the calendar overview. Further, A plurality of trip identifiers can be provided in calendar overview 202, including, for example, trip identifiers 208, 210, and 212. Each trip identifier can represent an available trip between the origin and the destination. For example, trip identifier 208 represents a trip that departs the origin at 9:10 am, arrives at the destination at 9:37 am, and makes use of two walking paths and the "C" subway line.

The plurality of trip identifiers provided in calendar overview 202 can be ordered according to departure time, such that the trip identifier representing the trip having the earliest departure time is provided at the highest position, as shown in FIG. 2. Alternatively, the plurality of trip identifiers can be ordered based on other parameters or can be maintained and presented in an ordering that was provided by the mapping service or other trip identification functionality.

Each of trip identifiers 208, 210, and 212 can include one or more portions which respectively correspond to one or more legs included in the trips trip identifiers 208, 210, and 212 respectively represent. For example, trip identifier 212 can include portions 214, 216, 218, 220, and 222. Each of portions 214-222 can correspond to a leg of the trip represented by trip identifier 212.

As an example, portion 214 of trip identifier 212 can correspond to walking from the origin to $14^{th}$ St. from 9:16 am to 9:20 am. Portion 216 can correspond to taking subway line "A" from $14^{th}$ St. to $59^{th}$ St.-Columbus Circle from 9:20 am to 9:30 am. Portion 218 can correspond to waiting at $59^{th}$ St.-Columbus Circle from 9:30 am to 9:31 am. Portion 220 can correspond to taking subway line "B" from $59^{th}$ St.-Columbus Circle to $96^{th}$ St. from 9:31 am to 9:37 am. Portion 222 can correspond to walking from $96^{th}$ St. to the destination from 9:37 am to 9:43 am.

It will be appreciated that, in some implementations, waiting at a station is not considered an individual leg of a trip. Instead such period of waiting can be incorporated into another leg of the trip or simply be treated as a period of time between legs of the trip.

Each of portions 214-222 can have a length that is generally proportional to the duration of its corresponding leg. In particular, in the instance in which axis 206 provides uniformly spaced units of time, as shown in FIG. 2, portions 214-222 can be directly proportional to the duration of their corresponding legs.

Furthermore, each of portions 214-222 can indicate a mode of transportation utilized by its corresponding leg. For example, portion 216 corresponds to travel using subway line "A". Thus, an icon 224 can be provided with portion 216 which indicates that subway is the mode of transportation. Icon 224 can further indicate the identity of the transit line being employed: "A". As another example, portion 222 corresponds to travel across a walking path. Therefore, an icon 226 can be provided in or along with portion 222 which indicates that walking is the mode of transportation.

Icons 224 and 226 can be stylized or shown according to any suitable size or appearance. In one implementation, icon 224 is designed to resemble the particular symbols used by the transit provider or transit authority such that a user of a system implementing the present disclosure can more easily correlate portion 216 with access to and use of subway line "A".

In addition, any other suitable information can be presented in or along with trip identifiers 208, 210, and 212. For example, trip identifier 212 further indicates a trip departure time 228, a trip arrival time 230, and a trip duration 232.

Furthermore, each of portions 214-222 can be depicted using unique and/or identifiable styles so that additional information can be communicated to the user. For example, as shown in FIG. 2, portions 214 and 222 are depicted using a dotted line to represent use of a walking path, while portions 216 and 220 are presented using an unbroken line. Further, one or more colors, patterns, or other stylistic choices can be used to differentiate portions of a trip identifier.

Calendar overview 202 can include further features, such as, for example, a current time indicator 234 and a desired departure time indicator 236. Current time indicator 234 can be any suitable form of indicator that indicates the current time. For example, as shown in FIG. 2, current time indicator can be a bar that is perpendicular to axis 206. The position of current time indicator 234 with respect to axis 206 can be continuously or periodically updated such that it generally reflects the current time of the day.

Desired departure time indicator 236 can indicate the departure time that was entered by the user when the plurality of trips were requested. For example, as shown in FIG. 2, desired departure time indicator 236 can be a bar that is perpendicular to axis 206.

Axis 206 can be automatically scaled by a system implementing calendar overview 202. For example, the scale of axis 206 can be automatically adjusted based on the duration of the trips that are to be represented in the calendar overview. Thus, the most useful information can be displayed across the relevant period of time whether the displayed trips have a relatively long duration or a relatively short duration, Further, in some implementations, gaps or breaks in time can be included in axis 206. A visual indicator can be provided to alert the user that a period of time has been omitted from the graph. As an example, if no trips are available from the origin to the destination between the hours of 2 am and 7 am, then such interval of time can be omitted from the graph and an indicator can be provided. As another example, if all trips displayed have an overlapping period of time in which no change in status occurs (i.e. no useful information to convey), then such overlapping period can be omitted from the graph and an indicator can be provided.

According to another aspect of the present disclosure, the interval of time depicted by calendar overview 202 can be adjusted by a user. For example, as shown in FIG. 2, calendar overview 202 provides trips with departure times and arrival times included in the depicted interval of time, 9:04 am-9:56 am. However, a user can adjust or otherwise interact with calendar overview 202 such that a different interval of time is depicted or provided by calendar overview 202. Importantly, when the interval of time provided by calendar overview 202 is adjusted, additional trip identifiers are provided that represent additional trips available during the different interval of time provided by the adjusted calendar overview 202. In such fashion, the best trips available over an extended period of time can be explored using calendar overview 202.

As an example, a user can select left paddle 238 to adjust the interval of time provided by calendar overview 202 to an earlier time. For example, by clicking on or pressing on left paddle 238, calendar overview 202 can be adjusted by a predefined amount, such as, for example, thirty minutes. Similarly, a user can select right paddle 240 to adjust the interval of time provided by calendar overview 202 to a later time. For example, after clicking or pressing right paddle 240, the interval of time provided by calendar overview 202 can be shifted thirty minutes forward (e.g. from 9:04 am-9:56 am to 9:34 am-10:26 am.

Other controls can be provided to interact with calendar overview 202 as well. As an example, a user can click or press, hold, and drag axis 206 left or right in order to adjust the interval of time provided by calendar overview 202. For example, selecting, holding, and dragging axis 206 to the right can cause graph 204 to be negatively scrolled with respect to axis 206 (i.e. move the depicted interval of time to the right such that an earlier interval of time is provided). Likewise, selecting, holding, and dragging axis 206 to the left can cause graph 204 to be positively scrolled with respect to axis 206 (move the depicted interval of time to the left such that a later interval of time is provided). As another example, graph 204 can be scrolled by hovering a cursor over graph area 204 and operating a scroll wheel.

As yet another example, in one implementation, clicking, holding, and dragging graph area 204 to the right or left can adjust the interval of time shown. In another implementation which employs a touch-sensitive display, pressing, holding, and dragging graph area 204 to the right or left with two touch-items (e.g. fingers) can allow a user to adjust the interval of time shown.

It will be appreciated that the control methods provided herein are exemplary in nature. Thus, alternative control methods can be used in satisfaction of the present disclosure, including controls which incorporate a flicking motion, pinching motions, tapping, double-tapping, two-item rotation, or other suitable controls. As an example, in one implementation, the scale of axis 206 can be adjusted using pinching motions on graph area 204 or by selecting, holding, and dragging axis 206 itself.

According to an aspect of the present disclosure, when the interval of time provided by calendar overview 202 is adjusted by a user, the trip identifiers provided in calendar overview 202 can be moved correspondingly. For example, when graph 204 is positively scrolled with respect to axis 206 (i.e. scrolled so that later times are shown), the trip identifiers can be moved upwards and to the left until they are respectively removed from the field of view. In such fashion, the user is given an intuitive visual sense that she is moving on to a later time and that the shown trip identifiers are receding in accordance with the earlier time of their corresponding trips.

Similarly, when graph 204 is negatively scrolled with respect to axis 206 (i.e. scrolled so that earlier times are shown), the trip identifiers can be moved downwards and to the right until they are respectively removed from the field of view. In such fashion, the user is given an intuitive visual sense that she is moving back to an earlier time and that the shown trip identifiers are proceeding in accordance with the later time of their corresponding trip.

According to another aspect of the present disclosure, the trip identifiers visually provided on graph 204 can be limited to those trip identifiers that represent trips having both their departure time and their arrival time included in the interval of time currently depicted by graph 204. For example, as shown in FIG. 2, each of the trip identifiers provided on graph 204 represents a trip having a departure time and an arrival time included in the depicted interval of time.

Therefore, when the interval of time provided by calendar overview 202 is adjusted by a user, a trip identifier can be removed from graph 204 (i.e. no longer visually depicted) when either the departure time or arrival time of its associated trip is no longer included in the interval of time depicted by graph 204. However, such constraint can optionally be enforced and is, therefore, not a mandatory or necessary feature of the present disclosure.

As another example, the trip identifiers visually provided on graph 204 can be limited to those trip identifiers that represent trips having both their departure time and their arrival time included in a central zone of graph 204. More particularly, a buffer zone can be defined on either side of graph 204. For example, the first five minutes and last five minutes of the interval of time depicted can be defined as respective buffer zones. Thus, with respect to exemplary graph 204 of FIG. 2, the interval 9:04 am-9:09 am could be currently included in a left buffer zone and the interval 9:51 am-9:56 am could be included in a right buffer zone.

As such, a central zone can be defined between such buffer zones. Thus, with respect to exemplary graph 204 of FIG. 2, the interval 9:10 am-9:50 am can be included in the central zone. The trip identifiers provided can be limited to those that represent trips having both their departure and arrival time included in the central zone. Further, when the interval of time provided by calendar overview 202 is adjusted by a user, a trip identifier can be removed from graph 204 (i.e. no longer visually depicted) when either the departure time or arrival time of its associated trip is no longer included in the interval of time depicted in the central zone.

According to yet another aspect of the present disclosure, each of the trip identifiers provided in calendar overview 202, including trip identifiers 208, 210, and 212, can be capable of being selected by a user. When a trip identifier is selected, all other trip identifiers can be presented in a faded fashion.

Figure 3:
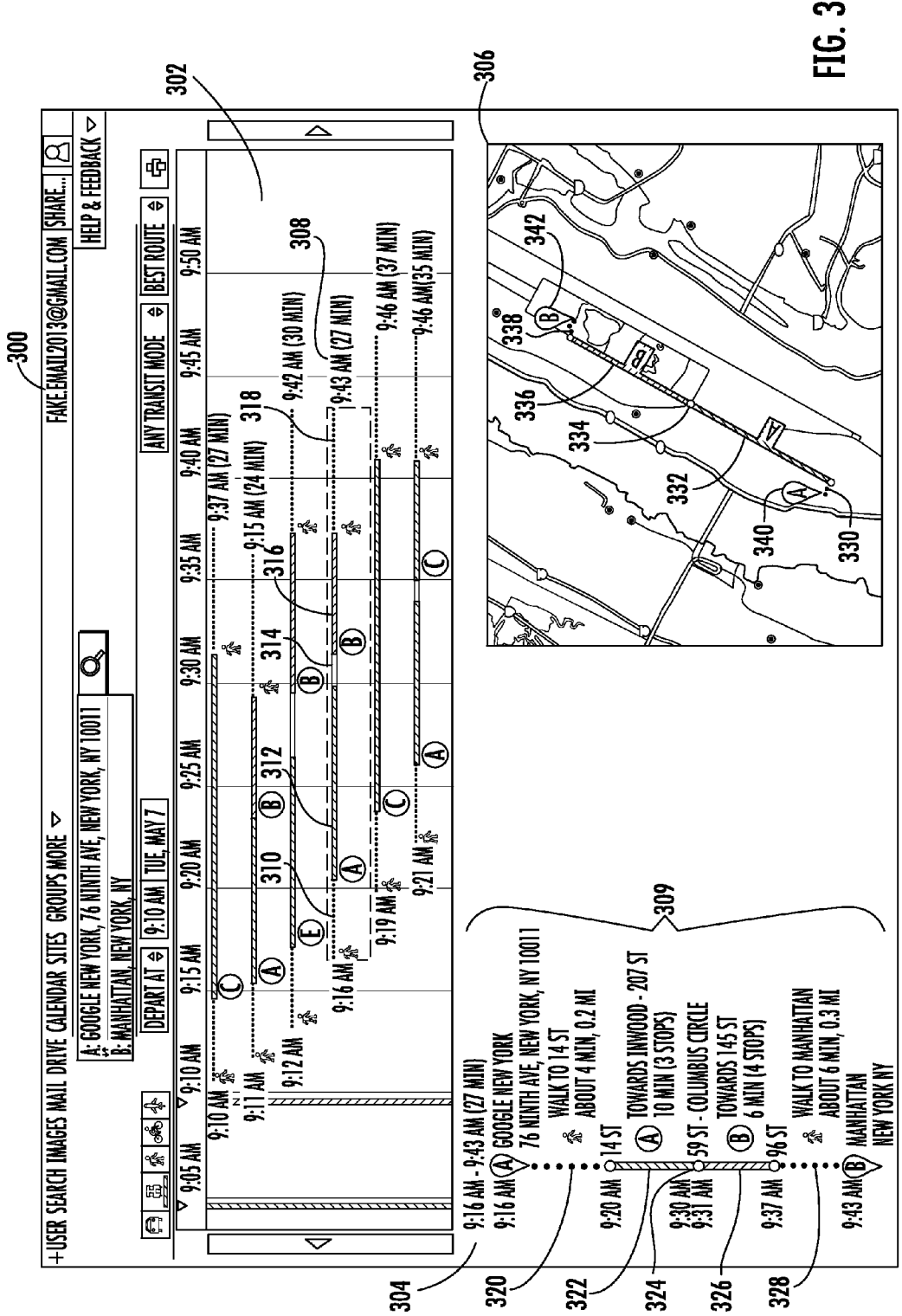
FIG. 3 depicts an exemplary user interface according to an exemplary embodiment of the present disclosure.

Importantly, when a trip identifier is selected by a user, additional information concerning the trip represented by the selected trip identifier can be provided to the user. For example, FIG. 3 depicts an exemplary user interface 300 according to an exemplary embodiment of the present disclosure. User interface 300 includes a calendar overview 302, a trip summary portion 304, and a map portion 306.

As shown in FIG. 3, a trip identifier 308 has been selected by a user. Trip identifier 308 includes portions 310, 312, 314, 316, and 318.

Responsive to the user selection of trip identifier 308, trip summary portion 304 can include a trip summary 309 that provides additional information about each leg of the trip represented by trip identifier 308. For example, trip summary 309 can include descriptions 320-328 which respectively correspond to portions 310-318. Each of descriptions 320-328 can describe a corresponding leg of the selected trip by providing information including, but not limited to, a leg departure time, a leg arrival time, a leg origin, a leg destination, a leg duration, a leg distance, a leg mode of transportation, or any other suitable information, such as particular transit line, vehicle, or transit provider used, or number of stops traversed.

Further in response to the user selection of trip identifier 308, the trip represented by trip identifier 308 can be depicted on map portion 306. In particular, each of the legs of such trip can be individually depicted using a variety of colors, patterns, indicators, icons, shadings, text, and/or other suitable identifiers. For example, the depicted trip includes depicted legs 330-338, depicted origin 340 and depicted destination 342.

In addition, one or more overlays can be provided on one or more of calendar overview 302, trip summary 309, or map portion 306. For example, a traffic overlay can be provided. The traffic overlay can depict current traffic conditions using various colors or patterns. The traffic overlay can also describe any delays being experienced by one or more of the transit lines employed by the selected trip. For example, if portion 312 of trip identifier 308 corresponds to use of subway line "A," and subway line "A" is experiencing delays, then one or more of portion 312, leg description 322, and depicted leg 332 can be shown, depicted, or provided with an alternate rendering such that a user can ascertain that subway line "A" is currently experiencing delays.

As another example, one or more notifications can be provided on one or more of calendar overview 302, trip summary 309, or map portion 306. For example, if subway line "A" is experiencing delays, then one or more of portion 312, leg description 322, and depicted leg 332 can include or be accompanied by a notification. For example, the notification can be an illustrated exclamation mark that provides additional text information when selected by the user or hovered over using a cursor.

Other exemplary overlays include a transit service outage overlay, road construction overlay, road closure overlay, an elevation overlay for bicycling routes, or any other suitable overlay or combinations thereof.

Furthermore, although a single trip identifier 308 is shown as selected in FIG. 3 and, therefore, only a single trip summary 309 is provided and a single trip depicted in map portion 306, the present disclosure is not limited to such functionality. In particular, in one implementation, two or more trip identifiers can be selected at the same time. As a result, two or more trip summaries can be provided in trip summary portion 304 and two or more trips can be depicted in map portion 306. For example, a user can hold the Ctrl key to select two or more trip identifiers. In such fashion, a user can compare two or more available trips in various formats.

Figure 4:
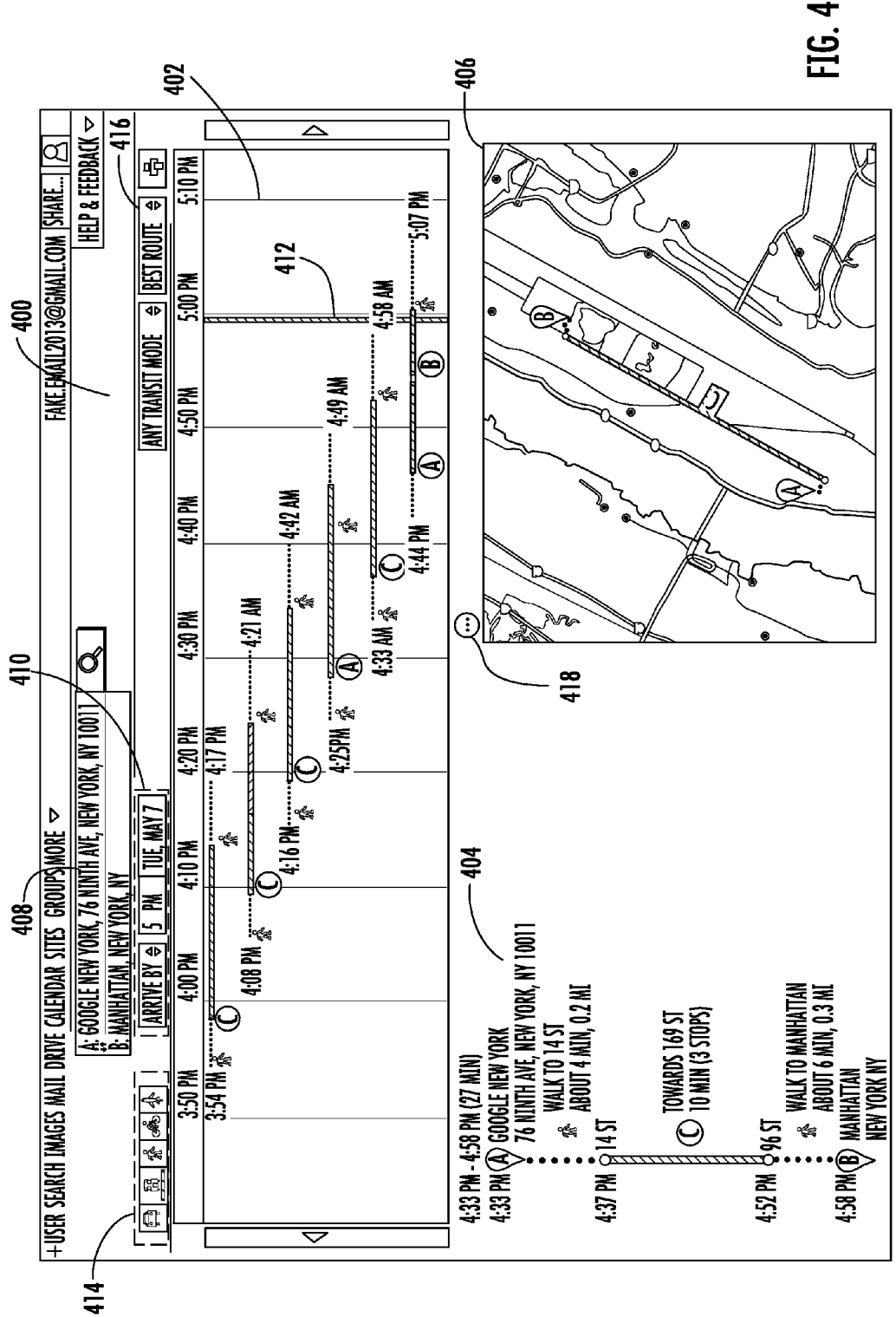
FIG. 4 depicts an exemplary user interface according to an exemplary embodiment of the present disclosure.

FIG. 4 depicts an exemplary user interface 400 according to an exemplary embodiment of the present disclosure. User interface 400 includes calendar overview 402, trip summary portion 404, and map portion 406.

User interface 400 also includes an origin/destination control 408 and a desired arrival/departure time control 410. Controls 112 and 114 can be text entry fields, dialog boxes, toggles providing a plurality of predefined selectable options, or any other suitable item that provides user control functionality.

In particular, as shown in FIG. 4, the user has entered a desired origin and destination into origin/destination control 408 and requested trips that arrive by 5 pm on Tuesday, May 7$^{th}$ using desired arrival/departure control 410. As a result, a plurality of trip identifiers are provided in calendar overview 402 that represent available trips between the provided origin and destination that arrive generally at, before, or around the provided desired arrival time. Further, a desired arrival time indicator 412 is provided in calendar overview 402 which indicates the desired arrival time with respect to the provided trip identifiers. For example, desired arrival time indicator 412 is shown in FIG. 4 as a vertical bar at 5:00 pm.

Other controls provided by user interface 400 include transportation class selection buttons 414 and trip preference toggles 416. Exemplary transportation classes include driving, transit, walking, bicycling, flying, or other suitable transportation classes. The transit transportation class can include trips which use rail lines, bus lines, tram lines, ferry lines, trains, or any other suitable form of transit transportation.

Transportation class selection buttons 414 can allow a user to filter all available trips between the origin and the destination based on transportation class. Alternatively, transportation class selection buttons can be used to request trips using a particular transportation class from the mapping service or trip identification functionality.

In some implementations, only a single one of the transportation class selection buttons 414 can be selected at a single time. Thus, as shown in FIG. 4, if the transit class button is selected, then only trip identifiers that represent available transit trips will be provided in calendar overview 402. In other implementations, two or more of the transportation class selection buttons 414 can be selected at the same time, such that trip identifiers that represent a mix of trips that use any of the selected transportation classes can be provided in calendar overview 402.

Trip preference toggles 416 can be used by a user to provide additional information about trip preferences. For example, a user can provide additional information about a preferred vehicle type by selecting from among the options: "Any transit mode;" "Bus:" "Subway;" "Train;" "Tram/Light Rail;" or any other suitable vehicle type option, including, for example, "Taxi." As another example, a user can provide additional information about preferred route types by selecting from among the options: "Best route;" "Fewer transfers;" "Less walking;" or any other suitable route type, including, for example, "Wheelchair accessible."

According to an aspect of the present disclosure, user interface 400 can also include a portion size control 418. In particular, by selecting and dragging portion size control 418 upwards or downwards, a user can control the amount of user interface 400 that is dedicated to each of calendar overview 402, trip summary portion 404, and map portion 406.

As an example, if a user selects, holds, and drags portion size control 418 downwards, then the size of calendar overview 402 with respect to the vertical axis can be increased. In such instance, additional trip identifiers representing additional trips can be provided at additional positions on such vertical axis. In such fashion, a user can control the size of calendar portion 402 to depict more or fewer trip identifiers. Alternatively, a control can be provided which states "Show More Results" and can be selected to provide additional trips.

Figure 5:
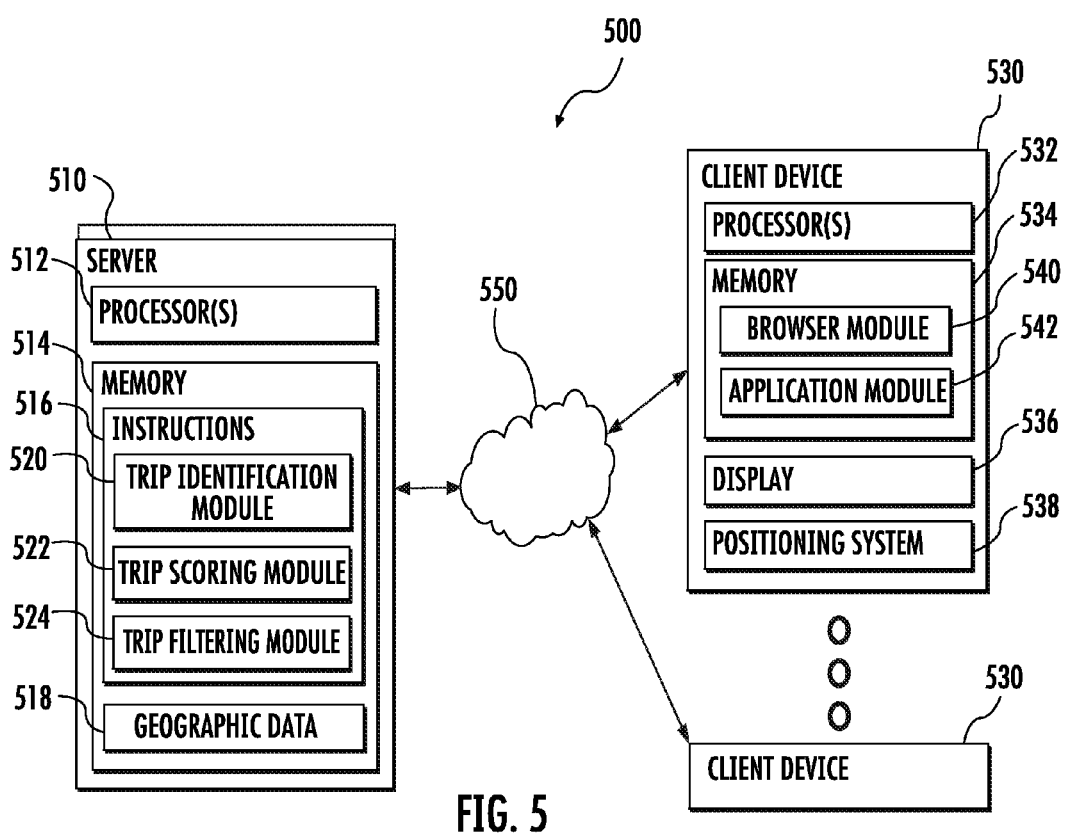
FIG. 5 depicts an exemplary computing system according to an exemplary embodiment of the present disclosure.

FIG. 5 depicts an exemplary computing system 500 that can be used to implement the interactive user interface for providing a plurality of available trips between an origin and a destination according to aspects of the present disclosure. The system 500 is a client-server architecture that includes a server 510 that communicates with one or more client devices 530 over a network 550. The system 500 can be implemented using other suitable architectures, such as a single computing device.

The system 500 includes a server 510, such as a web server. The server can be implemented using any suitable computing device(s). The server 510 can have a processor(s) 512 and a memory 514. The server 510 can also include a network interface used to communicate with one or more remote computing devices (e.g. client devices) 530 over a network 550.

The processor(s) 512 can be any suitable processing device, such as a microprocessor, microcontroller, integrated circuit, or other suitable processing device. The memory 514 can include any suitable computing system or media, including, but not limited to, non-transitory computer-readable media, RAM, ROM, hard drives, flash drives, or other memory devices. The memory 514 can store information accessible by processor(s) 512, including instructions 516 that can be executed by processor(s) 512. The instructions 516 can be any set of instructions that when executed by the processor(s) 512, cause the processor(s) 512 to provide desired functionality.

In particular, the instructions 516 can be executed by the processor(s) 512 to implement a trip identification module 520, a trip scoring module 522, and a trip filtering module 524.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Server 510 can implement trip identification module 520 to identify one or more trips in response to a user query. For example, trip identification module 520 can be implemented to perform one or more search algorithms with respect to data describing available trips between an origin and a destination.

Server 510 can implement trip scoring module 522 to provide a score for each trip identified by trip identification module 520. For example, trip scoring module 522 can be implemented to determine and provide a score for a plurality of trips based on any number of parameters, including user-provided preferences or criteria.

Server 510 can implement trip filtering module 524 to filter or order identified trips. For example, trip filtering module can be implemented to filter trips based on the respective scores determined by trip scoring module 522 or based on other parameters.

Memory 514 can also include data 518, such as geographic data, that can be retrieved, manipulated, created, or stored by processor(s) 512. The data 518 can be stored in one or more databases. The one or more databases can be connected to the server 510 by a high bandwidth LAN or WAN, or can also be connected to server 510 through network 550. The one or more databases can be split up so that they are located in multiple locales.

The server 510 can exchange data with one or more client devices 530 over the network 550. Although two clients 530 are illustrated in FIG. 10, any number of client devices 530 can be connected to the server 510 over the network 550. The client devices 530 can be any suitable type of computing device, such as a general purpose computer, special purpose computer, laptop, desktop, integrated circuit, mobile device, smartphone, tablet, or other suitable computing device.

Similar to server 510, a client device 530 can include a processor(s) 532 and a memory 534. The memory 534 can store information accessible by processor(s) 532, including instructions that can be executed by processor(s) and data. As an example, memory 534 can store a browser module 540 and an application module 542. Browser module 540 can provide instructions for implementing a browser. In particular, the user of client device 530 can exchange data with server 510 by using the browser to visit a website accessible at a particular web-address. The user interface of the present disclosure can be provided as an interface of the website.

Application module 542 can provide instructions for running a specialized application on client device 530. In particular, the specialized application can be used to exchange data with server 510 over the network 550. Application module 542 can include client-device-readable code for providing and operating the user interface of the present disclosure.

The client device 530 can include various input/output devices for providing and receiving information from a user, such as a touch screen, touch pad, data entry keys, speakers, mouse, and/or a microphone suitable for voice recognition. For instance, the client device 530 can have a display 536 for presenting information, such as the user interface of the present disclosure.

The client device 530 can also include a positioning system 538 that can be used to identify the position of the client device 530. The positioning system 538 can be optionally used by the user to monitor the user's position relative to a transit route. The positioning system 538 can be any device or circuitry for monitoring the position of the client device 530. For example, the positioning device 538 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

Importantly, in situations in which the systems and method discussed herein collect information about users, such as position data, user preferences, or other information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in or more ways before it is stored or used, so that personally identifiable information is removed.

The network 550 can be any type of communications network, such as a local area network (e.g. intranet), wide area network (e.g. Internet), or some combination thereof. The network 550 can also include a direct connection between a client device 530 and the server 510. In general, communication between the server 510 and a client device 530 can be carried via network interface using any type of wired and/or wireless connection, using a variety of communication protocols (e.g. TCP/IP, HTTP), encodings or formats (e.g. HTML, XML), and/or protection schemes (e.g. VPN, secure HTTP, SSL).

Figure 6:
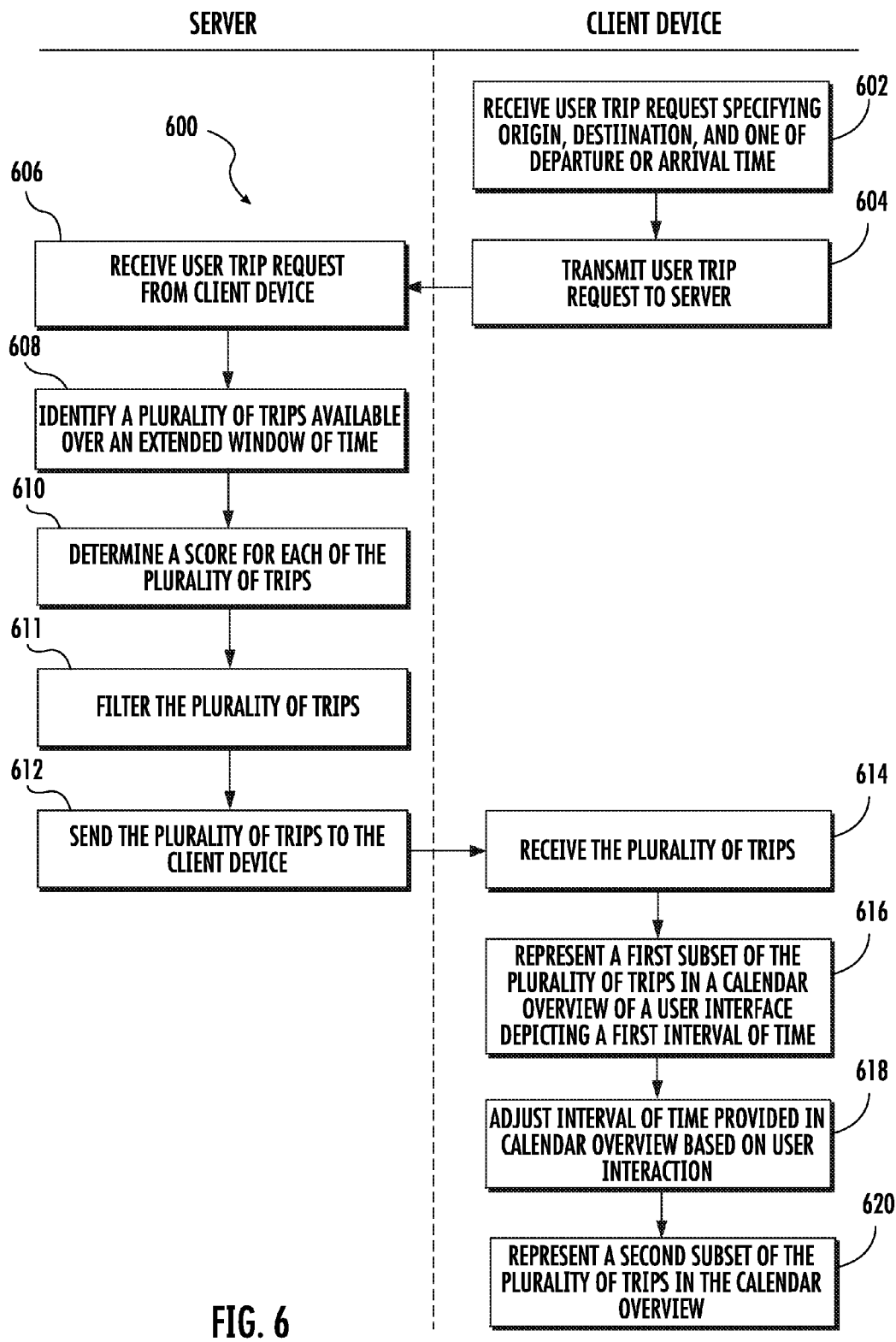
FIG. 6 depicts a flow diagram of an exemplary method for presenting available trips to a user according to an exemplary embodiment of the present disclosure.

FIG. 6 depicts a client-server flow diagram of an exemplary method (600) for presenting available trips to a user according to an exemplary embodiment of the present disclosure. The method (600) can be implemented using any computing device or system, such as the client-server arrangement of system 500 of FIG. 5. In addition, FIG. 6 depicts steps performed in a particular order for purposes of illustration and discussion. Those of ordinary skill in the art, using the disclosures provided herein, will understand that the various steps of any of the methods disclosed herein can be omitted, adapted, and/or rearranged in various ways.

At (602) the client device can receive or obtain a user trip request. The user trip request can specify an origin, a destination, and one of a departure or arrival time. As an example, a user can enter such information into a client device using origin/destination control 112 and desired arrival/departure control 114 of user interface 100 of FIG. 1.

At (604) the client device transmits the user trip request to the server. At (606) the server receives the user trip request from the client device. As an example, client device 530 can transmit the user trip request to server 510 over network 550.

At (608) the server can identify a plurality of trips available over an extended window of time. For example, server 510 can implement trip identification module 520 to identify the plurality of trips. The identified plurality of trips can be available over an window of time surrounding either the desired departure or arrival time specified in the user trip request.

As an example, the plurality of trips identified at (608) can include all trips available from the departure to the origin within a five hour window surrounding the desired departure or arrival time. In one implementation, trip identification module 520 is configured to perform one or more search algorithms with respect to transportation data such as a transit graph in order to identify the plurality of trips.

At (610) the server can determine a score for each of the plurality of trips. For example, server 510 can implement trip scoring module 522 to determine a score for each of the trips identified at (608). Each score can be determined based on a plurality of factors, such as proximity to the desired departure or arrival time, duration, walking time, fares, number of legs, or any other suitable criteria. For example, the scores for the plurality of trips can take into account user-entered criteria, including, for example, criteria entered using transportation class selection buttons 414 and trip preference toggles 416 of FIG. 4.

At (611) the server can filter the plurality of trips. In particular, the trips identified at (608) can include all reasonable trips available over the extended window of time, which can be quite a sizeable number. At (611) the plurality of trips can be filtered so that the best or most relevant trips are ultimately provided to the user. As an example, server 510 can implement trip filtering module 524 to filter the plurality of trips according to their scores determined at (610).

As another example, the server can implement logic at (611) which ensures that trips utilizing a similar pattern or transit line over a given frequency are treated in the same fashion. Therefore, a user is given a clear picture of the frequency of available trips.

At (612) the server can send the plurality of trips to the client device. At (614) the client device can receive the plurality of trips from the server. As an example, server 510 can send the plurality of trips to a client device 530 over network 550.

At (616) the client device can represent a first subset of the plurality of trips in a calendar overview of a user interface. In particular, the calendar overview can depict a first interval of time. For example, the first interval of time can either follow the desired departure time or precede the desired arrival time. The first subset of trips represented at (616) can include the trips received at (614) which have a departure time and an arrival time included in the first interval of time.

As an example, the first subset of trips can be represented in the calendar overview using a plurality of trip identifiers. For example, each trip identifier can extend from the departure time to the arrival time of the trip it represents.

At (618) the client device can adjust the interval of time provided by the calendar overview based on user interaction. For example, a user can press and drag an aspect of the calendar overview or can hover over the calendar overview with a cursor and scroll. In response to such user interaction, the client device can adjust the interval of time provided by the calendar overview.

At (620) the client device can represent a second subset of the plurality of trips in the calendar overview. In particular, the second subset of the plurality of trips can include trips that are available during the adjusted interval of time displayed by the calendar overview. Therefore, the second subset of trips can include different or additional trips than the first subset of trips. In such fashion, a user can explore the trips available at different times of the day.

Figure 7A:
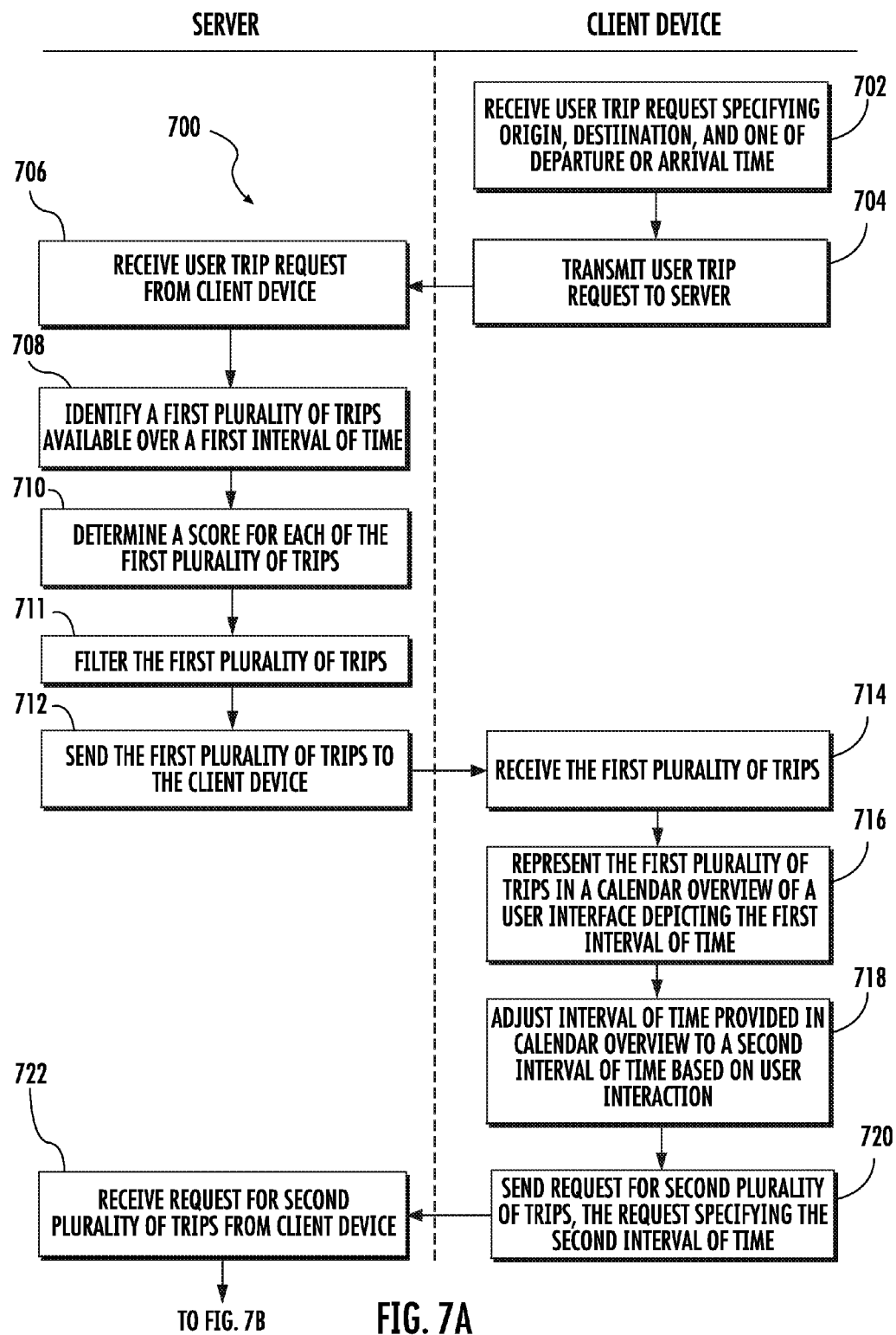
FIGS. 7A and 7B depict a flow diagram of an exemplary method for presenting available trips to a user according to an exemplary embodiment of the present disclosure.
Figure 7B:
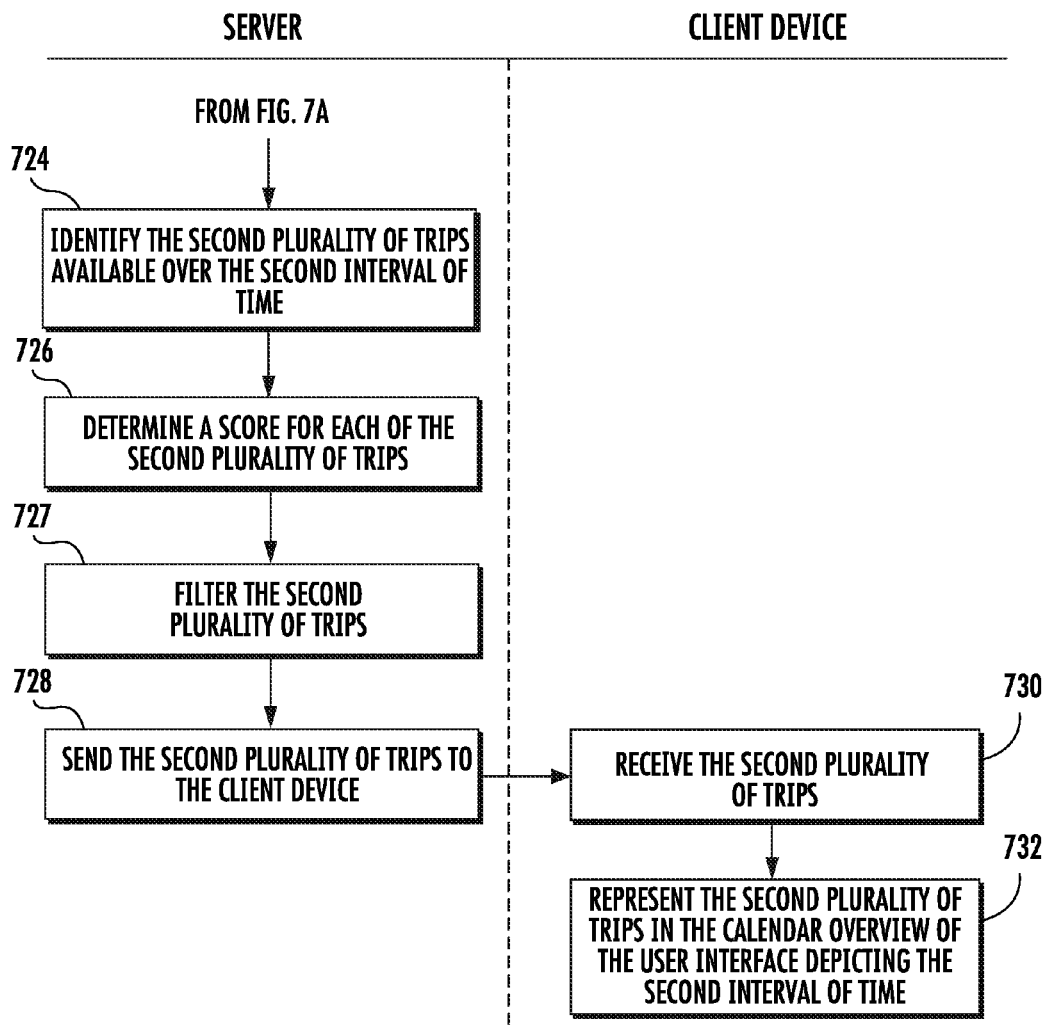

FIGS. 7A and 7B depict a client-server flow diagram of an exemplary method (700) for presenting available trips to a user according to an exemplary embodiment of the present disclosure. The method (700) can be implemented using any computing device or system, such as the client-server arrangement of system 500 of FIG. 5. In addition, FIGS. 7A and 7B depict steps performed in a particular order for purposes of illustration and discussion. Those of ordinary skill in the art, using the disclosures provided herein, will understand that the various steps of any of the methods disclosed herein can be omitted, adapted, and/or rearranged in various ways.

At (702) the client device can receive or obtain a user trip request. The user trip request can specify an origin, a destination, and one of a departure or arrival time. As an example, a user can enter such information into a client device using origin/destination control 112 and desired arrival/departure control 114 of user interface 100 of FIG. 1.

At (704) the client device transmits the user trip request to the server. At (706) the server receives the user trip request from the client device. As an example, client device 530 can transmit the user trip request to server 510 over network 550.

At (708) the server can identify a first plurality of trips available over a first interval of time. For example, server 510 can implement trip identification module 520 to identify the first plurality of trips. The identified plurality of trips can be available during a first window of time either before the desired departure time or after the desired arrival time specified in the user trip request. For example, the plurality of trips identified at (708) can include all trips available one hour after the desired departure time or one hour before the desired arrival time.

At (710) the server can determine a score for each of the first plurality of trips. For example, server 510 can implement trip scoring module 522 to determine a score for each of the trips identified at (708). Each score can be determined based on a plurality of factors, such as proximity to the desired departure or arrival time, duration, walking time, fares, number of legs, or any other suitable criteria. For example, the scores for the first plurality of trips can take into account user-entered criteria, including, for example, criteria entered using transportation class selection buttons 414 and trip preference toggles 416 of FIG. 4. The first plurality of trips can be filtered or ordered according to their scores.

At (711) the server can filter the first plurality of trips. In particular, the trips identified at (708) can include all reasonable trips available over the first interval of time, which can be a sizeable number. At (711) the first plurality of trips can be filtered so that the best or most relevant trips are ultimately provided to the user. As an example, server 510 can implement trip filtering module 524 to filter the first plurality of trips according to their scores determined at (710).

As another example, the server can implement logic at (711) which ensures that trips utilizing a similar pattern or transit line over a given frequency are treated in the same fashion. Therefore, a user is given a clear picture of the frequency of available trips.

At (712) the server can send the plurality of trips to the client device. At (714) the client device can receive the plurality of trips from the server. As an example, server 510 can send the plurality of trips to a client device 530 over network 550.

At (716) the client device can represent the first plurality of trips in a calendar overview of a user interface. The calendar overview can depict the first interval of time. As an example, the first plurality of trips can be represented in the calendar overview using a plurality of trip identifiers. Each trip identifier can extend from the departure time to the arrival time of the trip it represents.

At (718) the client device can adjust the interval of time provided by the calendar overview based on user interaction. In particular, the interval of time provided by the calendar overview can be adjusted to a second interval of time.

For example, a user can press and drag an aspect of the calendar overview or can hover over the calendar overview with a cursor and scroll. In response to such user interaction, the client device can adjust the interval of time provided by the calendar overview to the second interval of time.

At (720) the client device can send a request to the server for a second plurality of trips. The request can specify the second interval of time to which the calendar overview was adjusted at (718). At (722) the server can receive the request for the second plurality of trips.

Referring now to FIG. 7B, at (724) the server can identify a second plurality of trips. The second plurality of trips can be trips between the origin and the destination that are available over the second interval of time. For example, server 510 can implement trip identification module 520 to identify the second plurality of trips.

At (726) the server can determine a score for each of the second plurality of trips. For example, server 510 can implement trip scoring module 522 to determine a score for each of the trips identified at (724). Each score can be determined based on a plurality of factors, such as proximity to the desired departure or arrival time, duration, walking time, fares, number of legs, or any other suitable criteria. For example, the scores for the first plurality of trips can take into account user-entered criteria, including, for example, criteria entered using transportation class selection buttons 414 and trip preference toggles 416 of FIG. 4. The second plurality of trips can be filtered or ordered according to their scores.

At (727) the server can filter the second plurality of trips. In particular, the trips identified at (724) can include all reasonable trips available over the second interval of time, which can be a sizeable number. At (727) the second plurality of trips can be filtered so that the best or most relevant trips are ultimately provided to the user. As an example, server 510 can implement trip filtering module 524 to filter the second plurality of trips according to their scores determined at (726).

As another example, the server can implement logic at (727) which ensures that trips utilizing a similar pattern or transit line over a given frequency are treated in the same fashion. Therefore, a user is given a clear picture of the frequency of available trips.

At (728) the server can send the second plurality of trips to the client device. At (730) the client device can receive the plurality of trips from the server.

At (732) the client device can represent the second plurality of trips in the calendar overview of the user interface. In particular, the calendar overview can depict the second interval of time such that the second plurality of trips are shown as available during the second interval of time.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system comprising a processor and a memory, the computing system being configured to perform operations comprising:
    obtaining data describing a plurality of trips between an origin and a destination, each trip having a departure time and an arrival time; and
    respectively representing the plurality of trips with a plurality of trip identifiers at different positions on a first axis of a graph, the graph having units of time on a second axis, wherein each trip identifier extends from the arrival time to the departure time of the trip such trip identifier represents, and wherein an interval of time depicted by the graph can be adjusted by a user;
    responsive to a user request, scrolling the graph with respect to the second axis;
    when the graph is positive scrolled with respect to the second axis such that one of the departure times associated with one of the plurality of trips is no longer included in the interval of time depicted by the graph, removing from the graph the trip identifier representing the trip having the departure time which is no longer included in the interval of time depicted by the graph; and
    when the graph is negatively scrolled with respect to the second axis such that one of the arrival times associated with one of the plurality of trips is no longer included in the interval of time depicted by the graph, removing from the graph the trip identifier representing the trip having the departure time which is no longer included in the interval of time depicted by the graph.

2. The computing system of claim 1, being configured to perform further operations comprising populating the graph with additional trip identifiers representing additional trips when the interval of time depicted by the graph is adjusted by the user, the additional trips respectively having arrival times and departure times within the interval of time depicted by the graph after being adjusted by the user.

3. The computing system of claim 1, being configured to perform further operations comprising:
    receiving a user selection of one of the plurality of trip identifiers; and
    adjusting the plurality of trip identifiers such that all trip identifiers other than the selected trip identifier are presented in a faded fashion.

4. The computing system of claim 1, wherein:
    each of the plurality of trips comprises one or more legs; and
    each trip identifier comprises one or more portions respectively corresponding to the one or more legs of the trip such trip identifier represents.

5. The computing system of claim 4, wherein:
    each leg of each trip has a duration; and
    each portion of each trip identifier has a length that is proportional to the duration of the leg to which such portion corresponds.

6. The computing system of claim 4, wherein:
    each leg of each trip corresponds to transportation using one of a plurality of modes of transportation; and
    each portion of each trip identifier provides an indication of the mode of transportation used by the leg to which such portion corresponds.

7. The computing system of claim 1, being configured to perform further operations comprising:
    receiving a user selection of one of the plurality of trip identifiers; and
    depicting the trip represented by the selected trip identifier on a map.

8. The computing system of claim 1, being configured to perform further operations comprising updating a position of an indicator with respect to the second axis of the graph such that the indicator indicates a current time.

9. The computing system of claim 1, wherein the first axis comprises a y-axis and the second axis comprises an x-axis, the computing system being configured to perform operations comprising:
    responsive to a user request, scrolling the graph with respect to the x-axis;
    moving the plurality of trip identifiers upwards and to the left when the graph is positively scrolled with respect to the x-axis; and
    moving the plurality of trip identifiers downwards and to the right when the graph is negatively scrolled with respect to the x-axis.

10. The computing system of claim 1, wherein a size of the graph with respect to the first axis can be adjusted by a user such that additional trip identifiers representing additional trips can be provided at additional positions on the first axis when the size of the graph is increased with respect to the second axis.

11. A device comprising a processor and a memory, the device being configured to perform operations comprising:
  receiving data describing a plurality of trips between an origin and a destination, the data being responsive to a user request;
  providing to the user on a display of the device an interactive user interface for exploring the plurality of trips;
  wherein the interactive user interface comprises a calendar overview tool depicting the plurality of trips across an interval of time.

12. The device of claim 11, being configured to perform further operations comprising:
  receiving a user request to adjust the interval of time provided by the calendar overview tool;
  requesting and receiving data describing additional trips between the origin and the destination; and
  depicting the additional trips across the adjusted interval of time using the calendar overview tool.

13. A computing system comprising a processor and a memory, the computing system being configured to perform operations comprising:
  obtaining data describing a plurality of trips between an origin and a destination, each trip having a departure time and an arrival time; and
  respectively representing the plurality of trips with a plurality of trip identifiers at different positions on a y-axis of a graph, the graph having units of time on an x-axis, wherein each trip identifier extends from the arrival time to the departure time of the trip such trip identifier represents, and wherein an interval of time depicted by the graph can be adjusted by a user;
  responsive to a user request, scrolling the graph with respect to the x-axis;
  moving the plurality of trip identifiers upwards and to the left when the graph is positively scrolled with respect to the x-axis; and
  moving the plurality of trip identifiers downwards and to the right when the graph is negatively scrolled with respect to the x-axis.

\* \* \* \* \*